March 11, 1924. 1,486,476
E. F. BLOSS
PROCESS FOR UTILIZING HOG BLADDERS AS CASINGS FOR CHOPPED OR GROUND MEATS
Filed Sept. 29, 1923
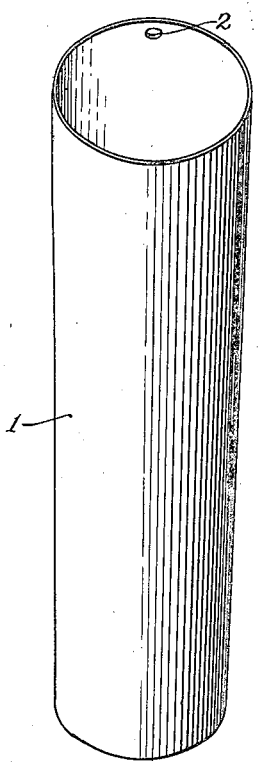
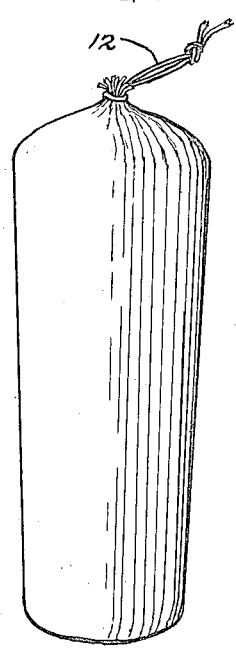
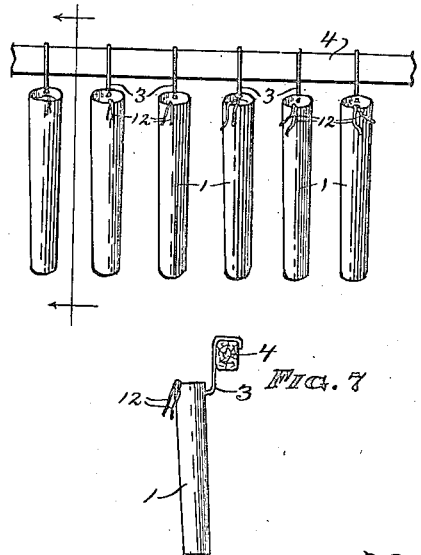
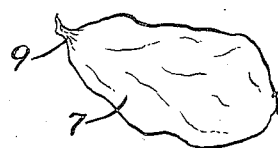
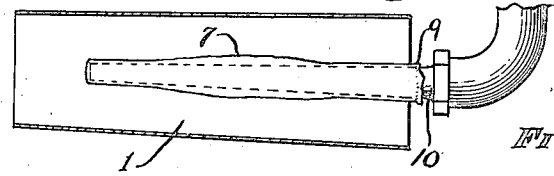
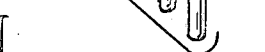
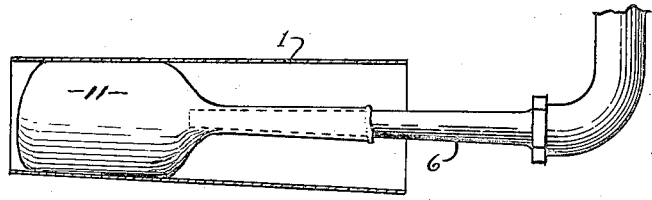
Inventor
Ernst F. Bloss
U. G. Charles
Attorney Patented Mar. 11, 1924.

1,486,476

UNITED STATES PATENT OFFICE.

ERNEST F. BLOSS, OF WICHITA, KANSAS, ASSIGNOR OF ONE-HALF TO FREDERICK W. DOLD, OF WICHITA, KANSAS.

PROCESS FOR UTILIZING HOG BLADDERS AS CASINGS FOR CHOPPED OR GROUND MEATS.

Application filed September 29, 1923. Serial No. 665,728.

*To all whom it may concern:*

Be it known that I, ERNEST F. BLOSS, a citizen of the United States, residing at Wichita, county of Sedgwick, and State of Kansas, have invented a new and useful Improvement in Processes for Utilizing Hog Bladders as Casings for Chopped or Ground Meats, reference being had to the accompanying drawings, which form a part of this application.

This invention relates to a process for utilizing hog bladders for casings for chopped or ground meats.

The objects of my invention are as follows:

First: My invention gives a commercial value for practical use to the hog bladder which has always been thrown into the grease tank or otherwise disposed of whereby the packer or slaughterer realized practically nothing for them.

Second: By thus using the hog bladder it is substituted for any and all kinds of sausage casings, covers or containers now in use in the manufacturing of sausage of any kind, size or shape with the exception of sausage known as weiners or coneys.

Third: My invention also by utilizing the hog bladders does away with the use of expensive casings or covers such as beef bladders, beef middles, beef rounds, beef bungs, beef weasands, hog bungs, hog stomachs, hog middles, clother covers, etc., all of which are expensive and add to the cost of production.

Fourth: Sausages stuffed in hog bladders under my invention are uniform in diameter and subject to variation as to length, thus a more uniform cooking of same is obtained, which is not always the case when using other casings, covers or containers.

Fifth: Sausages stuffed in hog bladders under my invention being uniform in diameter and practically so as to length, are as a finished product much more attractive looking which increases the sale value of any item.

Sixth: Hog bladders, when used under my invention do not burst while being stuffed and cooked as is the case in so many instances when stuffing and cooking sausages in other intestinal animal tubes.

Seventh: The labor cost of cleaning and preparing hog bladders for use is more easy and done at much less labor cost than the preparation of other animal intestinal tubes for the same purpose.

Referring to the drawings, Fig. 1 is a tubular form, functioning as a mould.

Fig. 2 shows the sausage when moulded.

Fig. 3 is a view of the stuffing tube and bladder in position at the end of the stuffer tube.

Fig. 4 is a view showing the bladder, stretched over the tube and extending into the form.

Fig. 5 is a view showing the bladder in the process of filling.

Fig. 6 is a view showing the forms containing the sausage hung on a bar when ready for cooking.

Fig. 7 is a sectional view on dotted line in Fig. 6, looking in the direction of arrows.

Fig. 8 is a view showing approximately the various shapes that may be obtained.

Referring to the drawings, 1 is a mould made of metal, said mould being slightly larger in diameter across one end than the other, so that the sausage when moulded and cooked will slide out of the larger end, the inside of which is smooth and uninterrupted and in the large end of the mould is an aperture 2, in which is placed a hook 3 as means for hanging said mould during the process of cooking, said hook having a hook on the opposite end thereof and adapted to engage over a bar 4 and the said form being smaller at the lower end, will prevent the sausage from sliding out. 5 is a conveyor pipe through which the chopped meat is forced and the said chopped or ground meat will pass through a tube 6, said tube being smaller at its outer end at which the hog bladder 7 is positioned for pulling back over the tube 6, which I do as follows:

I take the hog bladder and place the closed end against the end of the tube as at 8, forcing it back over the tube, turning the bladder wrong side out and allowing the end of said tube to pass through the neck 9 of said bladder until the neck 9 passes back to the large end of tube 6 as shown at 10 in Fig. 4 and in Fig. 4 is shown the bladder 7 in its proper position over the stuffing tube and projecting into the casing in proper position to force the ground or chopped meat, depositing it in the bladder casing as shown in Fig. 5 at 11 and as the said casing is filled the form and casing slide longitudinal with the tube 6 until the entire length of the bladder is filled with the prepared meat, then the end is tied together with a cord 12 as shown Fig. 2, and during this process the form 1 is a support, preventing the casing from breaking under the pressure required for proper filling and to retain the sausage in the casing in perfect condition, so that the casing will not break by handling thereafter, I hang the form with the sausage enclosed as shown in Fig. 6 and Fig. 7 on a series of racks prepared and the bulk is placed in a cooker where it is thoroughly cooked and when removed from the form the sausage is uniform in diameter, straight and smooth, and all being equal in cross section, it will be cooked uniformly, that is to say each sausage on the racks will be equally cooked through and when the process of cooking and forming is completed it is then removed from the form and placed on hooks by means of the cord 12, then hung on racks and placed into a smoking chamber for final treatment. Under this process the sausage is cooked first and then taken out of tubes or forms and smoked in the usual way.

My experience has been when I undertook to fill a hog bladder with ground meat to the proper consistency for packing the bladder was not of sufficient strength and would not stand cooking in natural state, therefore I conceived the idea of making a form to support the bladder while it was being stuffed and cooked, and the cooking in the form sets the hog bladder to the prepared meat, retaining the form. A further experiment proved that though the bladder was globular when inflated with air that by confining it in a tube the elasticity would travel in a longitudinal direction, making the sausages in various lengths and sizes as shown in Fig. 8, and without fracturing the bladder, and when cooked as above stated it will hold its shape, being smooth and uniform and a very much better looking class of goods and more uniformly cooked than I was able to produce under the old process of using beef casings and beef bladders which were of all sizes.

I do not confine myself to any particular size, proportion or form as the bladder is flexible and will conform to the mould that is prepared for it, to the extent of its elasticity and such modifications may be made as lie within the scope of the appended claim, and what I claim as new and desire to secure by Letters Patent is:

The process of producing a filled sausage, consisting in introducing a hog bladder in a hollow mold or form, having a substantially uninterrupted inner surface, filling the same while in said form, then applying heat to said mold and contained substances to cause said bladder to permanently conform itself to the shape of the mold and to adhere to the substance of the filling, and then removing said sausage longitudinally from said mold.

ERNEST F. BLOSS.